(12) United States Patent
Dhesikan et al.

(10) Patent No.: US 11,777,785 B2
(45) Date of Patent: Oct. 3, 2023

(54) ALERT THROTTLING

(71) Applicant: Cisco Technology, Inc., San Jose, CA (US)

(72) Inventors: Subhasri Dhesikan, San Jose, CA (US); Raghuram S. Sudhaakar, Fremont, CA (US); Kevin Holcomb, Cary, NC (US); Yaron Sella, Beit Nekofa (IL)

(73) Assignee: Cisco Technology, Inc., San Jose, CA (US)

( * ) Notice: Subject to any disclaimer, the term of this patent is extended or adjusted under 35 U.S.C. 154(b) by 529 days.

(21) Appl. No.: 15/876,162

(22) Filed: Jan. 21, 2018

(65) Prior Publication Data
US 2019/0229976 A1 Jul. 25, 2019

(51) Int. Cl.
*H04L 41/0604* (2022.01)
*H04L 41/0681* (2022.01)
*H04W 4/44* (2018.01)
*H04L 41/0686* (2022.01)
*H04L 47/215* (2022.01)
(Continued)

(52) U.S. Cl.
CPC ...... *H04L 41/0604* (2013.01); *H04L 12/2825* (2013.01); *H04L 41/069* (2013.01); *H04L 41/0681* (2013.01); *H04L 41/0686* (2013.01); *H04L 47/215* (2013.01); *H04W 4/44* (2018.02);
(Continued)

(58) Field of Classification Search
CPC . H04L 2012/40215; H04L 2012/40273; H04L 41/0604; H04L 41/0681; H04L 41/0686; H04L 41/069; H04L 47/215; H04L 12/2825; H04L 67/125; H04W 4/44;
(Continued)

(56) References Cited

U.S. PATENT DOCUMENTS 7,606,149 B2  10/2009  Kumar et al.
7,626,940 B2  12/2009  Jain
(Continued)

OTHER PUBLICATIONS

Davis, Tony et al.; Managing The SQL Server Transaction Log: Dealing With Explosive Log Growth (Mar. 14, 2013).
(Continued)

*Primary Examiner* — Oussama Roudani
(74) *Attorney, Agent, or Firm* — BEHMKE INNOVATION GROUP LLC; James M. Behmke; Jonathon P. Western (57) ABSTRACT

In one embodiment, methods, systems, and apparatus are described in which data to be used by a processor is stored in a memory. Network communications with a data center are enabled via a network interface. The processor maintains a reporting policy for reporting anomalous events to the data center, the reporting policy having at least one rule for determining a reporting action to be taken by the processor in response to an anomalous event. The processor further monitors the IoT device for a report of an occurrence of the anomalous event. The processor performs the reporting action according to the at least one rule, in response to the report of the occurrence of the anomalous event. An episodic update to the reporting policy from the data center may be received at the processor, which modifies the reporting policy in accordance with the update. Related methods, systems, and apparatus are also described.

17 Claims, 5 Drawing Sheets

(51) Int. Cl.
*H04L 41/069* (2022.01)
*H04L 12/28* (2006.01)
*H04L 12/40* (2006.01)

(52) U.S. Cl.
CPC .............. *H04L 2012/40215* (2013.01); *H04L 2012/40273* (2013.01)

(58) Field of Classification Search
CPC ....... H04W 4/02; H04W 4/025; H04W 4/027; H04W 4/30; H04W 4/38–48
See application file for complete search history.

(56) References Cited

U.S. PATENT DOCUMENTS

| | | | |
|---|---|---|---|
| 8,738,583 B2 | 5/2014 | Zhang et al. | |
| 8,903,593 B1 | 12/2014 | Addepalli et al. | |
| 9,712,549 B2* | 7/2017 | Almurayh | H04L 63/1425 |
| 2002/0119427 A1* | 8/2002 | Brown | G06F 21/552 434/1 |
| 2006/0003689 A1* | 1/2006 | Griffin | H04L 41/00 455/3.01 |
| 2007/0073740 A1* | 3/2007 | Kirshenbaum | G06F 9/4488 |
| 2008/0052395 A1* | 2/2008 | Wright | H04W 4/029 709/224 |
| 2008/0133732 A1* | 6/2008 | Satou | H04L 43/0817 709/223 |
| 2009/0033515 A1* | 2/2009 | Cavanaugh | H04W 4/02 340/8.1 |
| 2010/0082513 A1* | 4/2010 | Liu | H04L 63/1458 706/46 |
| 2010/0229236 A1* | 9/2010 | Rybak | H04L 51/12 726/22 |
| 2011/0141915 A1* | 6/2011 | Choi | H04L 41/0631 370/242 |
| 2012/0106329 A1* | 5/2012 | Ahmed | H04W 4/70 370/230 |
| 2012/0254947 A1* | 10/2012 | Dheap | H04L 63/20 726/4 |
| 2015/0071074 A1* | 3/2015 | Zaidi | H04L 47/215 370/235.1 |
| 2015/0106324 A1* | 4/2015 | Puri | G06F 11/079 706/52 |
| 2015/0195145 A1* | 7/2015 | Di Pietro | H04L 47/41 706/12 |
| 2015/0304437 A1* | 10/2015 | Vaccari | H04L 67/535 709/204 |
| 2015/0369924 A1* | 12/2015 | Hedgecock | G01S 5/0072 342/357.34 |
| 2016/0254944 A1 | 9/2016 | Larsson | |
| 2017/0026295 A1* | 1/2017 | Yin | H04L 43/0894 |
| 2017/0084147 A1* | 3/2017 | Modi | G08B 29/185 |
| 2017/0290075 A1* | 10/2017 | Carbajal | H04W 64/006 |
| 2017/0374572 A1* | 12/2017 | Kleinbeck | H04B 17/309 |
| 2018/0014217 A1* | 1/2018 | Kleinbeck | H04B 17/309 |
| 2018/0091327 A1* | 3/2018 | McLaughlin | H04L 12/4625 |
| 2018/0183832 A1* | 6/2018 | Chang | H04L 63/0428 |
| 2018/0205755 A1* | 7/2018 | Kavi | G06F 16/951 |
| 2018/0324636 A1* | 11/2018 | Laha | H04W 28/0289 |

OTHER PUBLICATIONS

Intel; Limiting Data Collection (viewed Aug. 30, 2017) Can be seen at: https://software.intel.com/en-us/node/609053.

Ipswitch, Inc.; Best Practices—Event Log Management for Security and Compliance Initiatives (2010).

Theissler, Andreas; Anomaly Detection in Recordings From In-Vehicle Networks; In Proceedings of Big Data Applications and Principles, First International Workshop, BIGDAP 2014 Madrid, Spain, Sep. 11-12, 2014.

* cited by examiner

FIG. 5

ALERT THROTTLING

TECHNICAL FIELD

The present disclosure generally relates to throttling of alerts in Internet-of-Things (IoT) systems.

BACKGROUND

IoT systems typically comprise a network of physical devices, vehicles, consumer devices and appliances and other items which comprise embedded electronics, software, sensors, actuators, network connectivity, and so forth. IoT allows objects to be sensed or controlled remotely across existing network infrastructure, often enabling improved efficiency, accuracy and economic benefit in addition to reduced human intervention.

The use of IoT technology enables reporting anomalies from IoT devices to data centers. Such anomalies may range from problems which call for minor debugging to problems which, in severe instances, may result in loss of life or limb. The ability to report these anomalies in real-time or near real-time may enable a fix to be sent, with appropriate security, over-the-air, to the reporting device. Additionally, similar devices which may also call for the fix, or which may be suspected of requiring the fix, may also be sent the fix, even without those particular devices sending reports of anomalies.

BRIEF DESCRIPTION OF THE DRAWINGS

The present disclosure will be understood and appreciated more fully from the following detailed description, taken in conjunction with the drawings in which.

BRIEF DESCRIPTION OF THE APPENDICES

The present disclosure will be understood and appreciated more fully from the following detailed description, taken in conjunction with the Appendices in which:

Appendix A is an exemplary Python code listing for one embodiment of the data center; and Appendix B is an exemplary Python code listing for one embodiment of a reporting engine in an IoT device.

DESCRIPTION OF EXAMPLE EMBODIMENTS

Overview

In one embodiment, methods, systems, and apparatus are described in which data to be used by a processor is stored in a memory. Network communications with a data center are enabled via a network interface. The processor maintains a reporting policy for reporting anomalous events to the data center, the reporting policy having at least one rule for determining a reporting action to be taken by the processor in response to an anomalous event. The processor further monitors the IoT device for a report of an occurrence of the anomalous event. The processor performs the reporting action according to the at least one rule, in response to the report of the occurrence of the anomalous event. An episodic update to the reporting policy from the data center may be received at the processor, which modifies the reporting policy in accordance with the update. Related methods, systems, and apparatus are also described.

Example Embodiment

Figure 1:
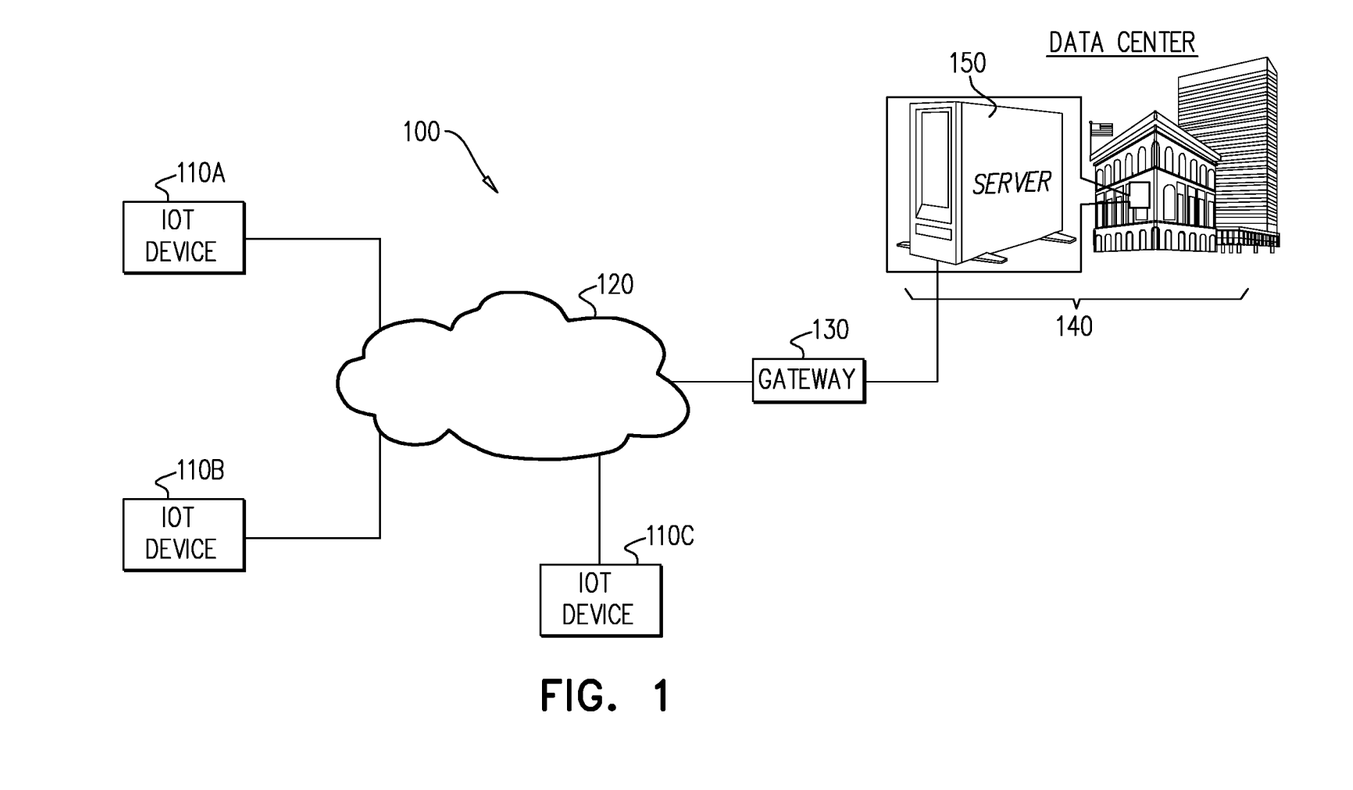
FIG. 1 is a simplified illustration of a plurality of Internet of Things (IoT) devices operative to communicate with a data center in accordance with an embodiment of the present disclosure.

Reference is now made to FIG. 1, which is a simplified illustration of a plurality of Internet of Things (IoT) devices 110A-110C which are operative to communicate with a data center in accordance with an embodiment of the present disclosure. The system 100 of FIG. 1 comprises the plurality of exemplary IoT devices 110A-110C in communication over a network 120 via a network gateway 130 with a data center 140. The data center 140 comprises a server 150 or other appropriate mechanism for communication with the network gateway 130.

The plurality of IoT devices 110A-110C typically have the ability to communicate anomalous events to the data center 140. The data center 140 may be a data center associated with an original equipment manufacturer (OEM). For example, one of the IoT devices 110B may be IoT enabled thermostat, then the IoT device 110B may be able to notify its respective OEM of an anomalous event, for example, a critical failure, which it may be experiencing, via the data center 140. Such reporting of anomalous events enables the OEM to track and anticipate problems, and where needed, to send appropriate software fixes to the plurality of IoT devices 110A-110C when possible.

In FIG. 1, the network 120 may be a local area network (LAN), a wide area network (WAN), or a cellular telephone communication network, for example, a Long-Term Evolution (LTE) network. The network may comprise various network components depending on its particular nature. By way of example, a LAN might contain various switches and routers, a WAN might additionally include edge servers, and so forth, as is known in the art. An LTE network might comprise various access network nodes, base stations, and other hardware and software adapted for packet transport in accordance with Evolved Packet Core architecture, as is known in the art.

Figure 2:
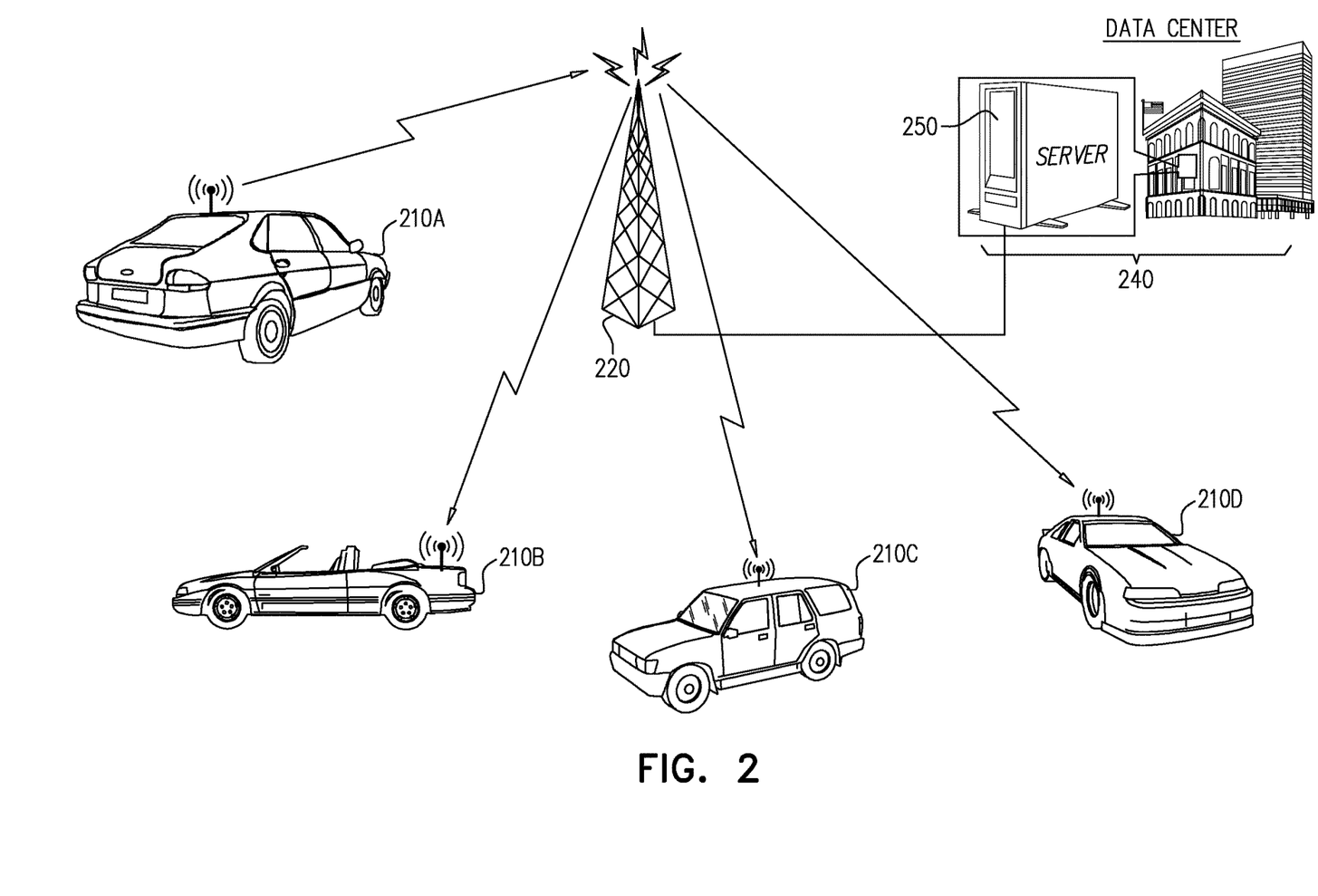
FIG. 2 is a simplified pictorial illustration of an exemplary embodiment of the system of FIG. 1, in which the IoT devices are connected vehicles.

Reference is now made to FIG. 2, which is a simplified pictorial illustration of an exemplary embodiment of the system of FIG. 1, in which the plurality of IoT devices 110A-110C are connected vehicles 210A-210D. It may be of use to the OEM to receive reports regarding various anomalies from the connected vehicles 210A-210D. The various anomalies include, but are not limited to mechanical anomalies, In-Vehicle Network (IVN) anomalies, cyber security anomalies, etc. The OEM typically maintains a data center, such as data center 240, which communicates over a network, such as LTE network 220 with the connected vehicles 210A-210D. These reports allow the OEM data center 240 (hereinafter simply referred to as "the data center 240") to anticipate potential problems in advance. By way of example, if a large pool of vehicles of a particular model experience brake failure after driving 25,000 miles, then brake failure may be anticipated by the OEM/data center 240 in other vehicles of that particular model which are nearing the 25,000 mile mark. The data center 240 typically comprises a server 250 which receives and processes these reports of anomalies.

In some cases, anomaly reports might be related to an entire vehicle-model and not to a specific vehicle (e.g. connected vehicle 210B), and then a large number of reports might be received, and thus the data center 240 might incur significant costs due to usage fees for using the LTE network 220. Furthermore, due to safety requirements of the automotive industry, the release cycle of software updates might be long, since extensive testing is needed before any new software can be delivered to the connected vehicles 210A-210D in the field. In the meantime, if the reported anomaly is frequent and exists in many connected vehicles 210A-210D, the data center 240 might be overwhelmed with unneeded reports, since an issue causing the reports is already well-known and is in the process of being resolved.

It is appreciated that the embodiment of FIG. 2 which is described in further detail below with reference to FIG. 3 speaks of a connected vehicle, e.g., the connected vehicles 210A-210D. The description herein in terms of connected vehicles 210A-210D is not meant to be limiting, but rather exemplary. Accordingly, it is understood that other embodiments might comprise other IoT devices besides connected vehicles. By way of example, medical implants such as pace makers may also be mobile IoT devices which might, either periodically or episodically, report an anomalous event pertaining to the implant. Other IoT devices which are in mobile or ambulatory situations might also implement embodiments of the description herein.

Figure 3:
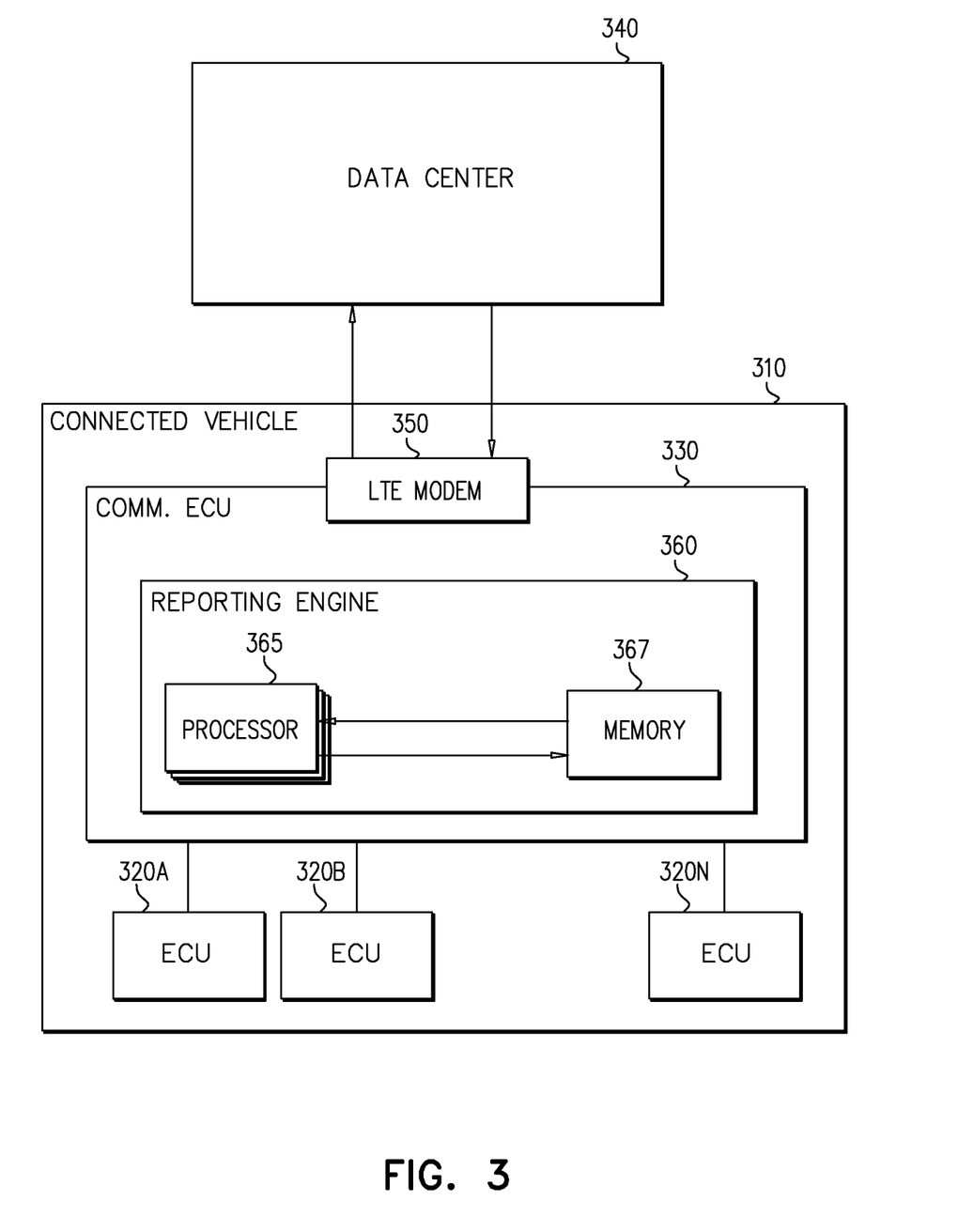
FIG. 3 is a simplified depiction of an embodiment of a connected vehicle-data center system in the embodiment depicted in FIG. 2.

Reference is now made to FIG. 3, which is a simplified depiction of an embodiment of a connected vehicle 310—data center 340 system, in the embodiment depicted in FIG. 2. Connected vehicle 310 corresponds to any of the connected vehicles 210A-210D of FIG. 2, and data center 340 corresponds to the data center 240 of FIG. 2. As is known in the art, in automotive systems, electronic control units (ECUs) 320A-320N are embedded electronic systems that control one or more of the electrical system or subsystems in a vehicle. Types of ECU include Engine Control Module (ECM), Transmission Control Module (TCM), Central Control Module (CCM), Central Timing Module (CTM), General Electronic Module (GEM), Body Control Module (BCM), Suspension Control Module (SCM), and so forth. One of the ECUs 320A-320N, in the connected vehicle 310 might detect an anomalous event. The one of the ECUs 320A-320N which detected the anomalous event may report the anomalous event to the data center 340. A communications ECU 330, which may comprise hardware and software components, enables the one of the ECUs 320A-320N to report the anomalous event to the data center 340 as described below.

By way of example, suppose that communication from the BCM to a controller area network bus (the "CAN bus") is faulty, resulting in communication errors on the CAN bus. In response, the BCM is effectively silenced, and eventually resets. The BCM might, under such circumstances send a report to the data center 340 along the lines of the following:
BCM event: code 2100: communication errors on CAN bus #2, at uptime=X1 seconds.
BCM event: code 2110: BCM silenced on CAN bus #2, at uptime=X2 seconds.
BCM event: code 2130: BCM self reset, at uptime=X3 seconds.

The communications ECU 330 comprises an LTE modem 350, which is adapted for communications with the data center 340 over an LTE communications network, such as the LTE network 220 of FIG. 2. It is appreciated that in other IoT systems, the LTE modem 350 may be replaced with an appropriate network interface. Additionally, the communications ECU 330 comprises memory 367 and one or more processor 365. The memory 367 of the communications ECU 330 is operative to store data used by the one or more processor 365. The memory 367 may comprise Random Access Memory (RAM), where machine readable instructions may reside during runtime, and a secondary memory. The secondary memory may include, for example, a flash memory, or a nonvolatile memory where a copy of the machine readable instructions or software may be stored. The secondary memory may also include ROM (read only memory), EPROM (erasable, programmable ROM), EEPROM (electrically erasable, programmable ROM).

The one or more processor 365 typically comprises dedicated hardware logic circuits, in the form of an application-specific integrated circuit (ASIC), field programmable gate array (FPGA), or full-custom integrated circuit, or a combination of such devices. Alternatively, or additionally, some or all of the functions of the processor may be carried out by a programmable processor, such as a microprocessor or digital signal processor (DSP), under the control of suitable software. This software may be downloaded to the processor in electronic form, over a network, for example. Alternatively, or additionally, the software may be stored on tangible storage media, such as optical, magnetic, or electronic memory media.

The one or more processor 365 in combination with the memory 367 is operative as a reporting engine 360. Reference is now additionally made to FIG. 4, which is a depiction of operational functions of the reporting engine 360.

Figure 4:
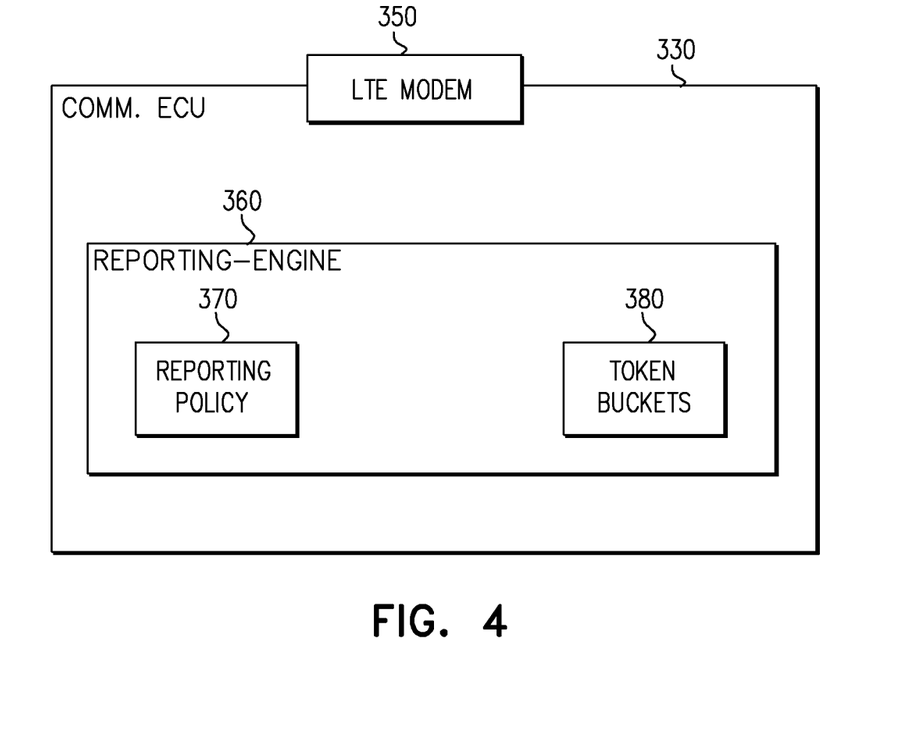
FIG. 4 is a depiction of operational functions of a reporting engine of FIG. 3.

The reporting engine 360 maintains at least one reporting policy 370 for reporting anomalous events to the data center 340, the at least one reporting policy 370 for determining a reporting action to be taken by the one or more processor 365 in response to an anomalous event of various types, as will be detailed below. The at least one reporting policy 370 determines what the reporting engine 360 does for specific types of anomaly report. For example, a grade is assigned to the anomalous event which is reported. The grading may be performed by looking up the anomalous event which is to be reported in a table or matrix containing a list of known anomalous events and their respective grades. The assigning of the grade is not necessarily part of a reporting mechanism or engine. For example, the grade may be assigned by whatever module that raised the anomaly event in question.

Grades may be applied to the anomaly event on a scale, ranging, for example, from: {Debug, Informational, Warning, Error, Fatal}.

Thus, the at least one reporting policy 370 might have one rule for "Debug" grade anomalies, and a second rule for "Error" grade anomalies, and so forth. An initial, default rule might state, for example, that any anomaly report rated "Error" or worse must be reported immediately with probability p=1.0. Other rules may be particular—for example, a rule might state that an anomaly event relating to the brakes with a grade level of Warning or higher must be reported with probability p=1.0. However, another rule may state that an anomaly event relating to the vehicle entertainment center may wait until a next regularly scheduled report. As will be described below, probability is one variable which might be used to set the at least one reporting policy 370. Other examples will be provided below.

However, after receiving a certain number, designated N, of anomaly reports from some large number N of connected vehicles 310 (for example, there might be 1,000,000 vehicles), where all N of the anomaly reports describe a same anomalous phenomenon, the data center 340 is deemed to be aware of the reported anomalous phenomenon. Accordingly, there is not much point to keep sending more reports describing the same already reported anomalous phenomenon. Thus, the data center 340 may modify the at least one reporting policy 370 and then send an updated version of the at least one reporting policy 370 to the reporting engine 360. For example, the particular anomaly, which had previous been reported 1,000,000 times to the data center 340 may now have its associated reporting probability p set to p=0.001.

As a result of modifying the reporting probability p from p=1.0 to p=0.001 the data center 340 is notified if the anomaly persists, and can thereby assess how many vehicles are still experiencing the anomaly. Nonetheless, an actual number of LTE cellular sessions initiated in order to continue to report this anomaly, and a workload in the data center 340 for recording these received reports, is accordingly decreased by three orders of magnitude. Such a saving is significant in any IoT environment (e.g., the system 100 of FIG. 1), but is even more significant in an environment which includes a high cost of reporting associated, in the present embodiment, with cellular network charges.

It is appreciated that when determining the reporting-probability, p, relative to the number of reports seen, N, the data center 340 is assured of receiving reports which accurately reflect an up to date status of the relevant anomaly per some target time-period. For example, assuming it is required that the data center 340 will have an up to date, accurate status per second, and assuming that the number of reports received by the data center 340 per second is N=1,000,000, it is safe to set the reporting-probability p to 0.001 (as in the example above), but not to 0.000001. This is so in the present example, since an expectation, EX, for the number of vehicles that will experience the anomaly per second is EX=p*N=0.001*1000000=1000. 1000 reports of an anomaly is a reasonably large enough number that the data center 340 can be assumed to have an accurate assessment of the real status on the basis of these received reports. On the other hand, for p=0.000001, EX=p*N=0.000001*1000000=1, meaning a single vehicle reporting the anomaly each second. This frequency of vehicles reporting anomalies is presumably too small, resulting in a fluctuating and non-accurate status measured at the data center 340. Since the number of active vehicles changes over time, the probability p may actually be a vector of time-dependent probabilities, designed to ensure that the expectation EX is above some desirable threshold at all times. These figures of the number of active vehicles at different time-windows are usually known from previously gathered statistics, which is not related specifically to the embodiments described herein.

As was noted above, the data center 340 may modify the at least one reporting policy 370 and then send an updated version of the at least one reporting policy 370 to the reporting engine 360. In some embodiments, the modification may be a modification of the at least one reporting policy 370 with respect to a specific anomaly. In some embodiments the modification may be delivered to a connected vehicle 310 which has reported this anomaly but not to other connected vehicles which have not reported the same anomaly. Alternatively, the modification may be a modification of the at least one reporting policy 370 which can be delivered to any relevant vehicle (for example, the same model; the same manufacturer; all vehicles which have the same model part which reported the anomaly regardless of vehicle manufacturer, etc.) that connects to the data center 340 for any reason (e.g., to deliver a periodic report).

In some embodiments, a policy update might be transient, and the reporting policy might be reset to its original state when the vehicle is next turned off and on. Alternatively, the policy update might have an expiration date and time. In other embodiments the policy update might be permanent, in which case it may be that only the data center 340 or an authorized service center may revoke the permanently modified reporting policy. Accordingly, when connected vehicle 310 reports an anomaly for which the default policy was modified, connected vehicle 310 may also report the modified rule itself. This is because the rule under which the report was made may now affect the way in which the report is treated. In addition, the data center 340 might want to introduce an additional policy update (e.g., which modifies the rule yet again).

Table 1, below, describes various categories of reporting options or rules and reporting actions, which the reporting engine 360 might take in response to the at least one reporting policy 370 that applies to a received anomaly report.

TABLE 1

| REPORTING POLICY | REPORTING ACTION |
|---|---|
| Deterministic Action | Report the anomaly immediately |
| | Log the anomaly, and report when the vehicle connects (for any reason) to the data center 340 |
| | Log the anomaly, and report when a scheduled report back session with the data center 340 occurs |
| | Log the anomaly, and report when a log buffer reaches its capacity limit |
| | Discard the report |
| Probabilistic Action | With probability p, report the anomaly, else discard the report |
| | With probability p, report the anomaly, else log the report |
| Token Bucket 380 Action (Token bucket with a specific bucket size is setup - see explanation below) | When the token bucket 380 is full, log the anomaly with a number of its occurrences, and empty the token bucket 380 |
| | When the token bucket 380 is full, report the anomaly with the number of its occurrences and empty the token bucket 380 |
| Vehicle Status Based Action | Report the anomaly at a specific date and/or time |
| | Report the anomaly when the vehicle is at a specific location (e.g., its home location, or a service center) |
| | Report the anomaly when the vehicle is operating at or above (or below) a certain speed |
| | Report the anomaly when the vehicle is operating at or above (or below) a certain number of engine rotations per minute |
| | Report the anomaly when the vehicle is operating at or above (or below) a certain engine temperature |

Table 1 describes a variety of exemplary reporting actions. It is appreciated, however, that the reporting actions might be applied in combination. For example, a first anomaly report might be reported with probability of p=0.01 if the vehicle is operating above a certain speed. Or, a second anomaly report might be reported if either the token bucket 380 is full, or when a scheduled report back session with the data center 340 occurs.

Updates of policy which are sent to the vehicles 310 are to be verified by reporting engine 360 to be genuine and authentic. The policy updates may also be protected against replay-attack by means of an ever-increasing version number or its equivalent as is known in the art. It is appreciated that, by contrast to a software patch or other fix sent to the connected vehicle over the air (or which may be applied at a service center), an update to the at least one reporting policy 370 may be released to the connected vehicle 310, often after a relatively short process (several hours up to 1-2 days), thus allowing fast response and significant savings in preventing unneeded (and potentially expensive) cellular communication.

Reference is now made to Appendix A, which is an exemplary Python code listing for one embodiment of the data center 340.

Reference is now made to Appendix B, which is an exemplary Python code listing for one embodiment of the reporting engine 360 in an IoT device, such as connected vehicle 310.

Referring back to Table 1, a brief discussion of the token bucket 380 is now provided. The token bucket (in general) is a method often implemented in packet switched computer networks and telecommunications networks. Token buckets can be used to check that data transmissions, in the form of packets, conform to defined limits on bandwidth and burstiness (a measure of the unevenness or variations in the traffic flow). Token buckets can also be used as a means for scheduling in order to ensure that the timing of transmissions comply with the limits set for the bandwidth and burstiness.

The token bucket 380, as may be implemented in embodiments described herein, is based on an analogy of a fixed capacity bucket into which tokens, typically representing an anomaly report, are added. When the bucket is full, the anomaly is either logged by the reporting engine 360; reported to the data center 340; or another appropriate action may be taken.

The above discussion of reporting options applies to reporting options which are useful when characteristics of the anomaly to be reported are known a priori, and the OEM or the operator of the data center 340 is able to develop (or has already developed) a statistical model of anomalies in order to determine either 'the probability or the bucket size for reporting the anomaly.

In certain cases, an anomalous event may occur which is not known a priori or, alternatively, the statistics for occurrences of said anomalous event may not be known a priori. Accordingly, a rule for reporting the anomalous event may not be associated with the at least one reporting policy 370. In such cases, determining a root cause of the anomalous event by post processing often requires logging of parameters of interest or a state vector of the connected vehicle 310 (which will be an a priori known list) for further analysis. Typically, unknown anomalous events occur with state vectors varying significantly between two occurrences. (Note: when the state vector is the same for two occurrences of a previously unknown anomalous event, the anomalous event statistics may then be modeled and calculated a priori).

In order to minimize reporting of false positives for anomalous events, the confidence that the anomalous event is legitimate is to be developed at the source (the connected vehicle 310 itself) rather than at the data center 340. The following method may be used in an attempt to determine the root cause of the anomalous event and a subsequent sequence trail of the anomalous event.

A) When an unknown anomalous event E occurs, a state vector $x=(p_1, p_2, p_3, \ldots p_n)$, which constitutes a weighted representation of the parameters of interest is calculated, yielding a pair $\{E, x\}$. For example, if a vehicle hits a pot hole in a road on its daily commute each day over a series of four days, and this an excessive vibration event, the excessive vibration event may be a previously unknown anomalous event.

B) The validity of the event E (which may be used to determine if the anomalous event E is to be logged or not) uses a negative exponential model over time, i.e., confidence is proportional to $e^{-t}$. A first occurrence of the anomalous event E might be at time t0, with a corresponding state vector $x_0$. A second occurrence of the anomalous event E might be at time $t_1$, with a corresponding state vector $x_1$. Confidence in the validity of the anomalous event is based on the following formula:

$$\text{confidence}(t_1) = \text{confidence}(t_0) * \sigma^{-2}(x_1-x_0) * \alpha * e^{-t}$$

where $\sigma^2(x_1-x_0)$ is a variance of the state vectors difference, and $\alpha$ is an exponent coefficient (as will be discussed below in greater detail). The second occurrence of the anomalous event increases the confidence value if the anomalous event occurs again with different parameters of interest. In this way, anomalous events that occur due to steady state errors are filtered out. All of this is to say that the confidence is calculated assuming that the pair $\{E, x\}$ will be substantially the same at each instance of the event E. If the variance (i.e., $\sigma^2(x_1-x_0)$) is large, then confidence in the validity of the event will increase. On the other hand, if the state vectors $x_1$ and $x_0$ are similar, then the variance will approach zero, and confidence in the validity of the event will, accordingly, decrease. At a certain point, the confidence will exceed a threshold, as explained below, and the event is considered to be a "valid" event.

C) If the confidence, as calculated above by the connected vehicle 310, is greater than the threshold (which might be provided manually or by some higher order analytics), the event is immediately reported to the data center 340 with its accompanying state vectors. Thus, previously unknown events with varying state vectors can be identified and post processed with higher priority.

D) At time $t_0+t_{check}$, the confidence value of the anomalous event determines the logging priority of the anomalous event and tracking of the anomalous event is stopped in order to conserve resources on the CPU. That is to say, once the threshold is exceeded, the previously unknown event now becomes a known event. On the other hand, if the event does not repeat, it remains "unknown".

E) Steady state errors will typically have a very low confidence (close to 0) at time $t_0+t_{check}$. So, continuing with the above example of the car hitting a pothole, one event is caused per day for the one car. However, if ten thousand cars driving 5 miles have 1000 vibration events in those 5 miles, at a certain point this particular vibration event will pass the threshold, and the event will become known.

F) Validating and throttling, as described above, of an anomalous event which is not known a priori can be controlled by modifying $t_{check}$, an exponent coefficient (i.e., $\alpha$, as mentioned above), state vector element weights (which may be provided by an outside equipment manufacturer or a vehicle designer for each sensor, so, for instance, the brake may have a high weight, and the entertainment center may have a low weight) and the weight of the mean squared operation (i.e., the variance, $\sigma^2(x_1-x_0)$) when calculating the confidence.

Applying the above method for determining the root cause of the anomalous event enables the data center 340 to use captured state vectors to simulate and understand the unknown anomalous event.

Figure 5:
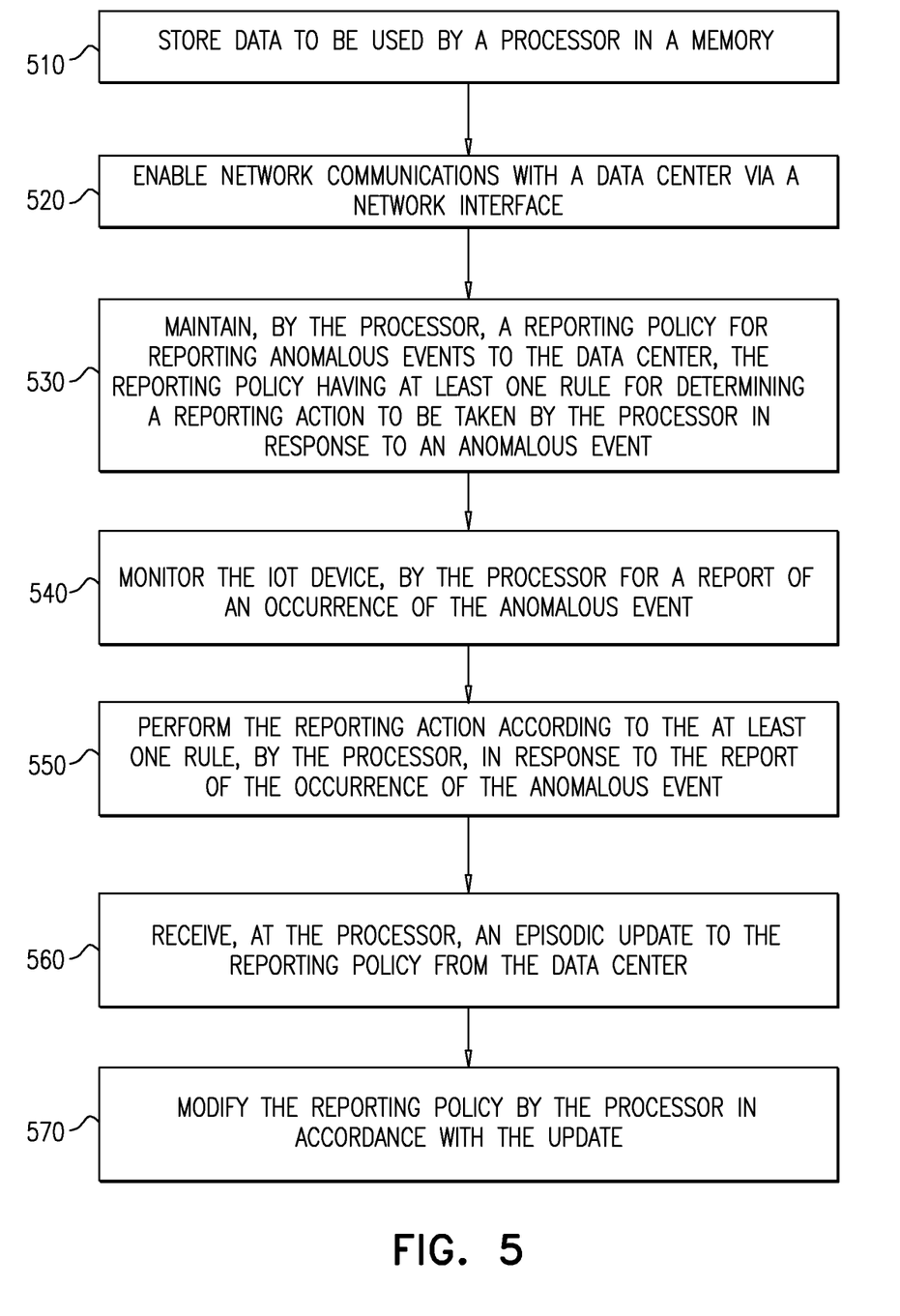
FIG. 5 is a flowchart of an exemplary method executed by one of the IoT devices of FIG. 1.

Reference is now made to FIG. 5, which is a flowchart of an exemplary method executed by one of the IoT devices of FIG. 1. At step 510 data to be used by a processor is stored in a memory. At step 520 network communications with a data center are enabled via a network interface. At step 530, the processor maintains a reporting policy for reporting anomalous events to the data center, the reporting policy having at least one rule for determining a reporting action to be taken by the processor in response to an anomalous event.

At step 540 the IoT device is monitored by the processor for a report of an occurrence of the anomalous event. The processor performs the reporting action according to the at least one rule in response to the report of the occurrence of the anomalous event (step 550).

At step 560 the processor receives an episodic update to the reporting policy from the data center. In response to receiving the episodic update, the processor modifies the reporting policy in accordance with the update (step 570).

It is appreciated that software components of the embodiments of present disclosure may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present disclosure.

It is appreciated that various features of embodiments which are, for clarity, described in the contexts of separate embodiments may also be provided in combination in a single embodiment. Conversely, various features of embodiments which are, for brevity, described in the context of a single embodiment may also be provided separately or in any suitable subcombination.

It will be appreciated by persons skilled in the art that embodiments described herein are not limited by what has been particularly shown and described hereinabove. Rather the scope of embodiments are defined by the appended claims and equivalents thereof:

APPENDIX A

Appendix A is an exemplary Python code listing for one embodiment of the data center:

```
#----------------------------------------------------------------
# Name:          CV_DataCenter
# Purpose:

# Author:

# Created:       21/05/2017
#----------------------------------------------------------------
#!/usr/bin/env python
import random
from multiprocessing.connection import Listener
# Fixed policy
def updatePolicy1(msg_id, total_reports):
    return [1.0,1]
# Define an updated policy
def updatePolicy(msg_id, total_reports):
    if total_reports < 10:
        return [1.0,1]
    elif total_reports < 20:
        return [0.5,3]
    else:
        return [0.25,5]
# Receive all incoming reports and handle them
def handleMessages (conn, num_of_msg_types, reports, est_msg_cnts):
    while True:
        # Get the message
        mess_in = conn.recv( )
        # Do something based on message received
        if type(mess_in) == list and len(mess_in) == 4:
            msg_id = mess_in[0]
            reports[msg_id] += 1
            total_reports = reports[msg_id]
            batch_size = mess_in[1]
            ratio = mess_in[2]
            pbs = mess_in[3]
            est_msg_cnts[msg_id] += batch_size/ratio
            #print "Got anomaly #", msg_id, "count = ",
            batch_size,
"policy = ", [ratio,pbs]
            mess_out = updatePolicy (msg_id, total_reports)
            conn.send (mess_out)
        elif type(mess_in) == str and mess_in == 'close':
            break
        else:
            print ("Got a bad message = ", mess_in)
def main( ):
    num_of_msg_types = 10
    est_msg_cnts = num_of_msg_types*[0]
    reports = num_of_msg_types*[0]
    address = ('localhost', 6000)   # family is deduced to be 'AF_INET'
    listener = Listener(address, authkey='secret password')
    conn = listener.accept( )
    print 'Connection accepted from', listener.last_accepted
    handleMessages (conn, num_of_msg_types, reports, est_msg_cnts)
    conn.close( )
    listener.close( )
    print "\nExecution summary:"
    print "------------------\n"
    print "Number of reports received =", sum(reports)
    print "Estimated # messages sent (total) =", sum(est_msg_cnts)
    print "Estimated # messages sent (details):"
    print est_msg_cnts
if __name__ == '__main__':
    main( )
```

APPENDIX B

Appendix B is an exemplary Python code listing for one embodiment of a reporting engine in an IoT device, such as the connected vehicles 210A-210D of FIG. 2:

```
#----------------------------------------------------------------
# Name:          Reporting Engine
# Purpose:

# Author:

# Created:       21/05/2017
#----------------------------------------------------------------
#!/usr/bin/env python
import time
import random
from multiprocessing.connection import Client
# Initialize policies data structure
def initPolicies(num_of_msg_types):
    return num_of_msg_types*[[1.0,1]]
# Initialize message buffers data structure
def initMsgBuffs(num_of_msg_types):
    return num_of_msg_types*[0]
# Pick message to send at random
def pickMessage(num_of_msg_types):
    msg_id = random.randint(0,num_of_msg_types-1)
    return msg_id
# Process message - Decide if message is ignored, batched or sent
def processMessage (msg_id, policies, msg_buffs):
    batch_size = 0
    # With some probability, the message is discarded
    if random.random( ) < policies[msg_id][0]:
        msg_buffs[msg_id] += 1
        #Buffer limit reached?
```

```
            if msg_buffs[msg_id] == policies[msg_id][1]:
                batch_size = msg_buffs[msg_id]
                msg_buffs[msg_id] = 0
        return batch_size
# Send all the anomaly reports
def sendMessages (conn, num_of_msg_types, policies, msg_buffs):
    num_of_events = 100000
    print "Generating", num_of_events, "anomaly events\n"
    for i in xrange(num_of_events):
        if (i+1)%(num_of_events/10) == 0:
            print "Anomaly events generated so far:",i+1, "..."
        msg_id = pickMessage(num_of_msg_types)
        batch_size = processMessage (msg_id, policies, msg_buffs)
        if batch_size > 0:
            # Message includes: msg-id, count, current policy
            mess_out                                        =
[msg_id,batch_size,policies[msg_id][0],policies[msg_id][1]]
            conn.send(mess_out)
            mess_in = conn.recv( )
            #Updating policy
            policies[msg_id] = mess_in
# Flush all remaining reports
def flushMessages (conn, num_of_msg_types, policies, msg_buffs):
    print "\nFlushing buffered anomaly events"
    for msg_id in xrange(num_of_msg_types):
        batch_size = msg_buffs[msg_id]
        if batch_size > 0:
            # Message includes: msg-id, count, current policy
            mess_out                                        =
[msg_id,batch_size,policies[msg_id][0],policies[msg_id][1]]
            conn.send(mess_out)
            mess_in = conn.recv( )
def main( ):
    num_of_msg_types = 10
    policies = initPolicies (num_of_msg_types)
    msg_buffs = initMsgBuffs (num_of_msg_types)
    address = ('localhost', 6000)
    conn = Client(address, authkey='secret password')
    sendMessages(conn, num_of_msg_types, policies, msg_buffs)
    flushMessages (conn, num_of_msg_types, policies, msg_buffs)
    conn.send('close')
    conn.close( )
    print "Done!"
if __name__ == '__main__':
    main( )
```

What is claimed is:

1. An Internet-of-Things (IoT) device comprising:
a memory operative to store data used by a processor;
a network interface operative to enable network communications with a data center; and
the processor operative to:
maintain a reporting policy for reporting anomalous events to the data center, the reporting policy having a plurality of reporting rules for determining a reporting action to be taken by the processor in response to an anomalous event, each of the plurality of reporting rules being indicative of a particular reporting probability;
monitor the IoT device for a report of an occurrence of the anomalous event;
in response to the report of the occurrence of the anomalous event, determine a reporting rule among the plurality of reporting rules and perform the reporting action according to a reporting probability indicated by the determined reporting rule, wherein the reporting action comprises logging the anomalous event when the anomalous event is not reported according to the reporting probability indicated by the determined reporting rule;
determine that the data center is sufficiently aware of the anomalous event when the anomalous event is reported to the data center a number of times greater than or equal to a threshold amount;
when the data center is sufficiently aware of the anomalous event, receive an update to the reporting policy from the data center, wherein the update indicates a decreased reporting probability that is determined based on a predefined desired number of times the anomalous event is expected to be reported to the data center; and
modify the reporting policy in accordance with the update such that future occurrences of the anomalous event are reported to the data center based upon the decreased reporting probability.

2. The IoT device according to claim 1 wherein the network interface comprises a Long-Term Evolution (LTE) modem.

3. The IoT device according to claim 1 wherein the IoT device comprises a connected vehicle.

4. The IoT device according to claim 3 wherein the processor receives the report of the anomalous event from an electronic control unit disposed in the connected vehicle.

5. The IoT device according to claim 1 wherein the reporting action comprises a deterministic reporting action.

6. The IoT device according to claim 5 wherein the deterministic reporting action comprises one of:
immediately reporting the anomalous event to the data center; and
logging the anomalous event.

7. The IoT device according to claim 1 wherein the reporting action comprises setting up a token bucket.

8. The IoT device according to claim 7 and further comprising logging a number of occurrences of the anomalous event when the token bucket is full, and emptying the token bucket.

9. The IoT device according to claim 7 and further comprising reporting a number of occurrences of the anomalous event when the token bucket is full, and emptying the token bucket.

10. The IoT device according to claim 1 wherein the reporting action comprises an IoT device status based action.

11. The IoT device according to claim 10 wherein the IoT device status based action comprises one of:
a date and time based status;
a location based status;
a speed based status;
a temperature based status.

12. The IoT device according to claim 1 wherein the anomalous event comprises an unknown anomalous event and further comprising, in response to the report of the occurrence of the unknown anomalous event not having a rule for determining the reporting action to be taken by the processor in response to the unknown anomalous event, the processor being operative to:
determine a state vector of the IoT device associated with the unknown anomalous event;
determine a confidence level that the unknown anomalous event is a valid anomalous event; and
report the unknown anomalous event and the state vector to the data center.

13. A method for an Internet-of-Things (IoT) device, the method comprising:
storing data to be used by a processor in a memory;
enabling network communications with a data center via a network interface;
maintaining, by the processor, a reporting policy for reporting anomalous events to the data center, the reporting policy having a plurality of reporting rules for determining a reporting action to be taken by the processor in response to an anomalous event, each of the plurality of reporting rules being indicative of a particular reporting probability;

monitoring, by the processor, the IoT device for a report of an occurrence of the anomalous event;

in response to the report of the occurrence of the anomalous event, determining, by the processor, a reporting rule among the plurality of reporting rules and performing, by the processor, the reporting action according to a reporting probability indicated by the determined reporting rule, wherein the reporting action comprises logging the anomalous event when the anomalous event is not reported according to the reporting probability indicated by the determined reporting rule;

determining, by the processor, that the data center is sufficiently aware of the anomalous event when the anomalous event is reported to the data center a number of times greater than or equal to a threshold amount;

when the data center is sufficiently aware of the anomalous event, receiving, at the processor, an update to the reporting policy from the data center, wherein the update indicates a decreased reporting probability that is determined based on a predefined desired number of times the anomalous event is expected to be reported to the data center; and modifying, by the processor, the reporting policy in accordance with the update such that future occurrences of the anomalous event are reported to the data center based upon the decreased reporting probability.

14. The method according to claim 13 wherein the network interface comprises a Long-Term Evolution (LTE) modem.

15. The method according to claim 13 wherein the IoT device comprises a connected vehicle.

16. The method according to claim 15 wherein the processor receives the report of the anomalous event from an electronic control unit disposed in the connected vehicle.

17. A software product, comprising a non transitory computer-readable medium in which program instructions are stored, which instructions, when read by a central processing unit (CPU), cause the CPU to:

maintain a reporting policy for reporting anomalous events to the data center, the reporting policy having a plurality of reporting rules for determining a reporting action to be taken by the CPU in response to an anomalous event, each of the plurality of reporting rules being indicative of a particular reporting probability;

monitor an Internet of Things (IoT) device for a report of an occurrence of the anomalous event;

in response to the report of the occurrence of the anomalous event, determine a reporting rule among the plurality of reporting rules and perform the reporting action according to a reporting probability indicated by the determined reporting rule, wherein the reporting action comprises logging the anomalous event when the anomalous event is not reported according to the reporting probability indicated by the determined reporting rule;

determine that the data center is sufficiently aware of the anomalous event when the anomalous event is reported to the data center a number of times greater than or equal to a threshold amount;

when the data center is sufficiently aware of the anomalous event, receive an update to the reporting policy from the data center, wherein the update indicates a decreased reporting probability that is determined based on a predefined desired number of times the anomalous event is expected to be reported to the data center; and modify the reporting policy in accordance with the update such that future occurrences of the anomalous event are reported to the data center based upon the decreased reporting probability.

* * * * *

UNITED STATES PATENT AND TRADEMARK OFFICE
CERTIFICATE OF CORRECTION

| | |
|---|---|
| PATENT NO. | : 11,777,785 B2 |
| APPLICATION NO. | : 15/876162 |
| DATED | : October 3, 2023 |
| INVENTOR(S) | : Subhasri Dhesikan et al. |

It is certified that error appears in the above-identified patent and that said Letters Patent is hereby corrected as shown below:

In the Specification

Column 8, Line 5, please amend as shown:
event E might be at time $t_o$, with a corresponding state Signed and Sealed this
Fifth Day of December, 2023

Katherine Kelly Vidal
*Director of the United States Patent and Trademark Office*